United States Patent
Kadoko

(10) Patent No.: US 11,923,667 B2
(45) Date of Patent: Mar. 5, 2024

(54) CABLE TRAY FABRICATED FROM CURABLE POLYMER STRIPS

(71) Applicant: ABB Schweiz AG, Baden (CH)

(72) Inventor: Jonah Kadoko, Cary, NC (US)

(73) Assignee: ABB Schweiz AG, Baden (CH)

(*) Notice: Subject to any disclaimer, the term of this patent is extended or adjusted under 35 U.S.C. 154(b) by 0 days.

(21) Appl. No.: 17/981,158

(22) Filed: Nov. 4, 2022

(65) Prior Publication Data

US 2023/0142001 A1  May 11, 2023

(30) Foreign Application Priority Data

Nov. 5, 2021 (CA) .................... 3137834

(51) Int. Cl.
| | |
|---|---|
| *H02G 3/04* | (2006.01) |
| *B29C 53/02* | (2006.01) |
| *B29C 65/56* | (2006.01) |
| *B29C 65/58* | (2006.01) |
| *F16L 3/26* | (2006.01) |
| *B29K 101/12* | (2006.01) |

(52) U.S. Cl.
CPC ........... *H02G 3/0456* (2013.01); *B29C 53/02* (2013.01); *B29C 65/564* (2013.01); *B29C 65/58* (2013.01); *F16L 3/26* (2013.01); *B29K 2101/12* (2013.01)

(58) Field of Classification Search
CPC ................ H02G 3/0456; F16L 3/26
USPC ......................................... 248/49
See application file for complete search history.

(56) References Cited

U.S. PATENT DOCUMENTS

| | | | | |
|---|---|---|---|---|
| 3,618,882 A * | 11/1971 | Podedworny | ............. | F16L 3/26 248/68.1 |
| 3,791,613 A * | 2/1974 | Nollen | ................. | H02G 3/0456 248/68.1 |
| 4,319,724 A * | 3/1982 | Bradbury | ............. | H02G 3/0456 248/68.1 |
| 5,580,014 A * | 12/1996 | Rinderer | ............. | H02G 3/0456 248/49 |
| 5,839,702 A * | 11/1998 | Jette | ..................... | H02G 3/0443 248/302 |
| 6,361,000 B1 * | 3/2002 | Jette | ..................... | H02G 3/0443 248/302 |
| 6,431,501 B1 * | 8/2002 | Molek | ................. | H02G 3/0456 248/68.1 |

(Continued)

OTHER PUBLICATIONS

ABB, "T&B Cable Tray: Metalic cable tray," product brochure, 257 pp.

*Primary Examiner* — Christopher Garft
(74) *Attorney, Agent, or Firm* — Leydig, Voit & Mayer, Ltd.

(57) ABSTRACT

A cable tray of the ladder type configuration can be fabricated from soft solid curable polymer strips comprised of a thermosetting material. The curable polymer strips in a pliable state may be wound into strip rolls for storage and transportation to the installation site. At the installation site, the soft solid curable polymer strips can be deployed, molded into pliable formed rail sections, and transversely connected together by a plurality of rungs. The curing process can be completed by, for example, exposing the thermosetting material to a ultraviolet or visible light source to produce hardened rail sections of the ladder type cable tray.

13 Claims, 9 Drawing Sheets

(56) References Cited

U.S. PATENT DOCUMENTS

| | | | | |
|---|---|---|---|---|
| 6,460,812 | B1* | 10/2002 | Jette | H02G 3/0443 |
| | | | | 248/68.1 |
| 6,637,704 | B2* | 10/2003 | Jette | H02G 3/0443 |
| | | | | 248/68.1 |
| 6,816,052 | B1* | 11/2004 | Ziegler | H02K 41/02 |
| | | | | 104/2 |
| 7,049,521 | B2* | 5/2006 | Marcotte | H02G 3/0437 |
| | | | | 174/68.3 |
| 9,819,163 | B1* | 11/2017 | Winn | F16L 3/23 |
| 2003/0178535 | A1* | 9/2003 | Jette | H02G 3/0443 |
| | | | | 248/49 |
| 2009/0152408 | A1* | 6/2009 | Pollard, Jr. | H02G 3/0456 |
| | | | | 248/58 |
| 2013/0240681 | A1* | 9/2013 | Woodlief | F16L 3/26 |
| | | | | 248/300 |
| 2016/0204586 | A1* | 7/2016 | Tally | B21J 15/04 |
| | | | | 248/68.1 |
| 2017/0110861 | A1* | 4/2017 | Öjerstav | H02G 3/0443 |
| 2017/0279256 | A1* | 9/2017 | Mostazo Oviedo | F16B 7/0473 |
| 2018/0231038 | A1* | 8/2018 | Shelton | H02G 3/0608 |
| 2023/0142001 | A1* | 5/2023 | Kadoko | B29C 65/564 |
| | | | | 248/49 |

\* cited by examiner

CABLE TRAY FABRICATED FROM CURABLE POLYMER STRIPS

CROSS-REFERENCE TO PRIOR APPLICATION

Priority is claimed to Canadian Patent Application No. CA 3137834, filed on Nov. 5, 2021, the entire disclosure of which is hereby incorporated by reference herein.

BACKGROUND

Cable tray systems are a type of cable organizational management system used to support and route flexible transmission cables about an installation such as, for example, an industrial, commercial, and/or residential building. The flexible transmission cables may range from large diameter power cables, to smaller data transfer and communication cables, to small diameter fiber optics. The cable tray system is assembled from a plurality of cable tray units or sections that are interconnected together in a generally longitudinal arrangement to provide a rigid structural system for directing the flexible cables through the installation. The cable tray units are each in the shape of a basket or trough for accommodating the flexible cables such that the flexible cables extend or run through the interconnected basket-shaped cable tray units in an organized or bundled manner with running loose.

Typical cable tray units are formed as rigid structures constructed from, for example, metal sheets or interconnected rods meshed together. Typical metals include steel and aluminum. To maneuverably guide and route the path of the flexible cables through the installation, the cable tray units can be provided in different configurations including straight units or sections that are elongated linearly and elbow units or bend sections that are curved in shape to alter the direction of the cable paths. The different configurations of cable tray units can be selectively arranged and interconnected to route the flexible cables around obstacles such as structural support columns, ductwork, plumbing or the like. Because of the rigid, preconfigured nature of the cable tray units, preplanning and design is a prerequisite for installation of the cable tray system. The present disclosure is directed to a novel design for a cable tray system that improves flexibility and customization during installation of the system.

BRIEF SUMMARY

The disclosure relates to a cable tray and a method of fabricating cable trays for accommodating and directing a plurality of flexible transmission cables through an installation. The cable tray can be fabricated from soft solid curable polymer strip comprised of thermosetting polymer. Lengths of the soft solid curable polymer strip can be deployed on site from, for example, a strip roll and cut to length to form a pliable unformed rail section. The pliable unformed rail section may be molded and formed, by hand or using molding tools, to produce a pliable formed rail section to correspond to an intended configuration for the cable tray. Two pliable formed rail sections can be arranged juxtaposed to each other and connected together with a plurality of rungs. The thermosetting material can next be cured to produce two hardened rail section intercommoned by rungs in the form of a ladder type cable tray.

A possible advantage of the disclosure is the facilitation of onsite fabrication assembly and customized configuration of the cable trays. A possible related advantage is the disclosure facilitates the storage and transportation of the material for fabricating a cable tray. These and other advantages and feature of the disclosure will be apparent from the following detailed description and the accompanying figures.

DETAILED DESCRIPTION

Figure 1:
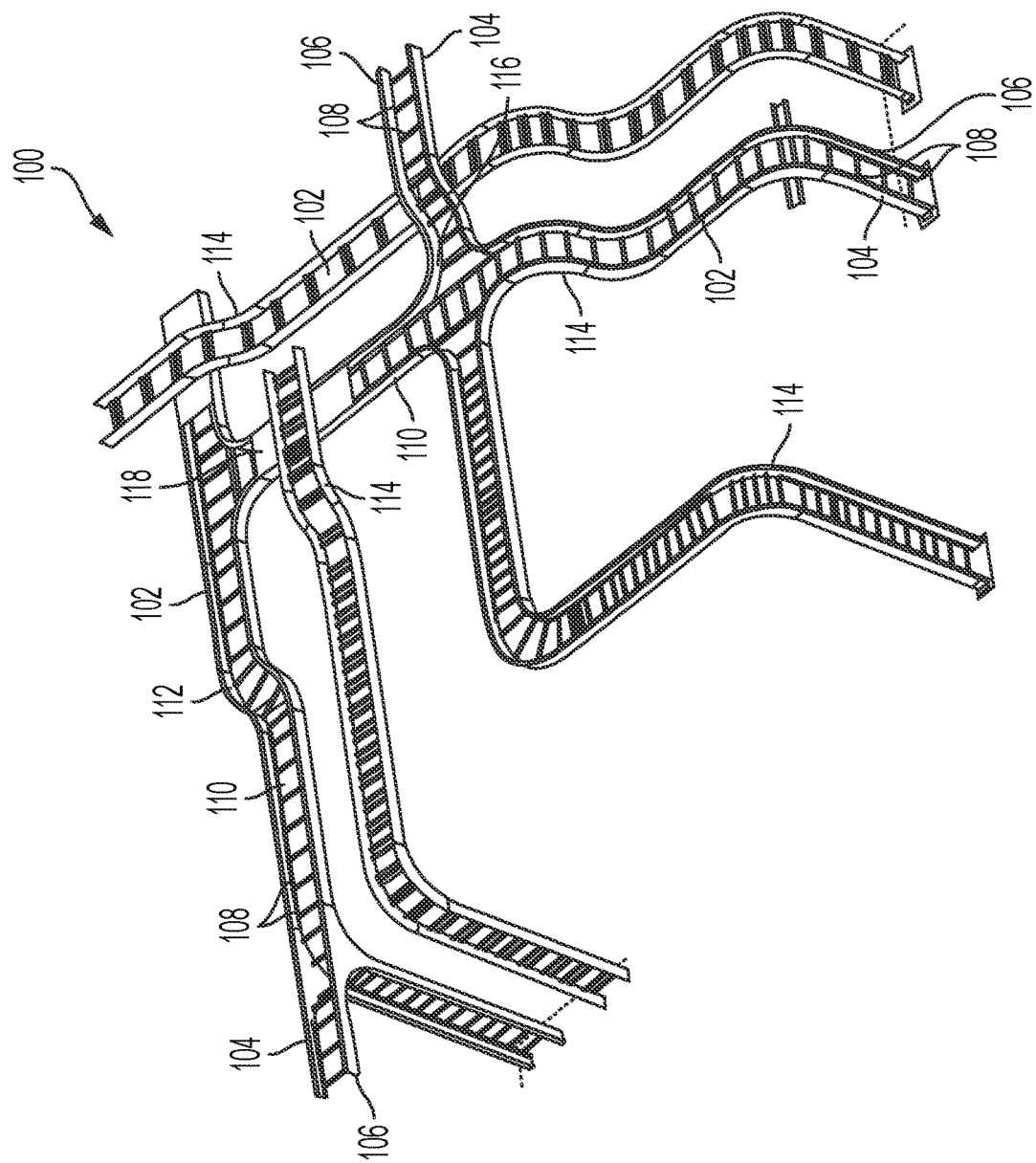
FIG. 1 is a perspective view of a cable tray system for routing flexible cables through an installation illustrating various configurations and shapes the cable trays may assume to change the direction or elevation of the cable tray system.

Now referring generally to FIG. 1 where, whenever possible, like reference numbers will refer to like elements, there is illustrated a cable tray system 100 that may be installed in a facility such as an industrial, commercial, or residential building. Cable tray systems 100 are used to support and route a plurality of flexible cables through the installation. The cable tray system 100 also typically elevates the plurality of flexible cables vertically above a lower floor to prevent interaction with water, dirt, etc. An elevated cable tray system 100 may be supported by vertically upright stanchions or suspended from hangers. As stated above, the cable tray systems 100 are often assembled from a plurality of cable tray units interconnected together. As referred to herein, the cable tray units individually or interconnected together may be commonly referred to as cable trays 102. The cable trays 102 are designed to hold and contain the plurality of flexible cables together, rather than allowing the cables to hang loose, and to provide a route or pathway for the cables to extend along between their termination points.

While different styles of cable trays 102 are known in the art including, for example, solid bottom trays formed from steel sheets and wire mesh trays formed from interconnected metal rods, the present disclosure is particularly directed toward ladder cable trays 102. Ladder cable trays 102 typically include a first elongated rail 104 and a second elongated rail 106 that are spaced apart from each other in a juxtaposed arrangement. The first and second elongated rails 104, 106 may be connected transversely by a plurality of rungs 108 that function to brace and maintain the first and second rails in the spaced-apart relation. In the longitudinal or lineal direction, the first and second elongate rails 104, 106 provide the continuous sides or edges of the cable tray 102 while the transverse rungs 108 that are intermittently spaced along the longitudinal or lineal direction provide horizontal support for the plurality of flexible cables. The elongated rails 104, 106 and the transverse rungs 108 provide an opened structure to facilitate installing or removing cables or rearranging or repairing cables.

To direct the plurality of cables around various obstacles at the facility or installation, such a structural supports, ductwork, and plumping, portions or sections of the cable trays 102 can have different configurations to change the direction of the cable tray system 100. For example, if the flexible cables only need to extend between two points in a linear direction, the cable trays 102 can be configured as straight sections 110 that are directed in a linear or straight path. However, if flexible cables need to change direction, the cable trays 102 may be configured as a horizontal elbow 112 or bend that provides a curved path in the horizontal plane. The horizontal elbows 112 may be curved through any desired angle including, for example, 45° angles, 90° or right angles, and 180° or U-bends to reverse the directional path of flexible cables. In addition, it may be desirable to change the elevation of the flexible cables and the cable trays 102 can be configured as vertical elbows 114 that change the directional path to a different horizontal plane. The vertical elbows 114 can also be provided with angles of curvature. Furthermore, cable trays 102 can be configured to form different junctures such as T-junctures 116 and crosses 118 so that subsets of the plurality of flexible cables extending along the directional path associated with one cable tray can be routed to a different directional path associated with another cable tray.

Figure 2:
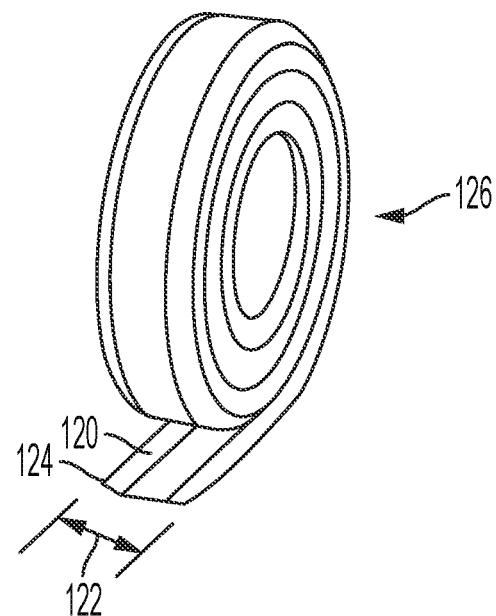
FIG. 2 is a perspective view of a wound roll of a soft solid curable polymer strip that may be unwound to deploy pliable unformed rail sections for fabricating a cable tray.
Figure 3:
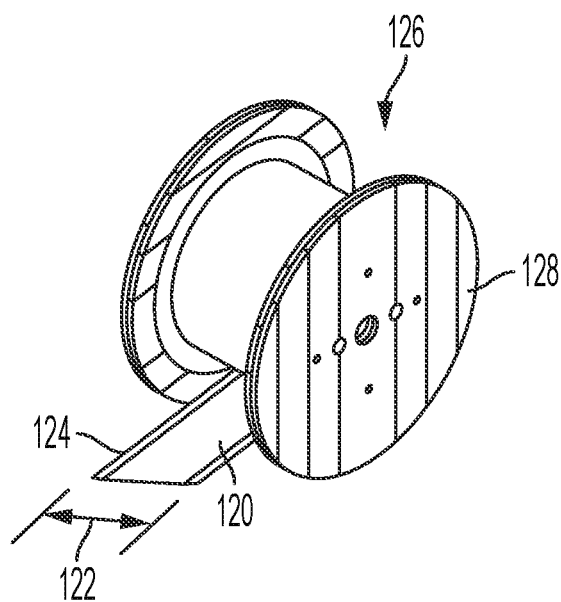
FIG. 3 is a perspective view of the soft solid curable polymer strip wound onto a strip spool that can be unreeled to deploy pliable unformed rail sections for fabricating a cable tray.

Referring to FIGS. 2 and 3, the cable trays in accordance with the disclosure may be fabricated from soft solid curable polymer strips 120. The soft solid curable polymer strip 120 can be comprised of a thermosetting polymer that is capable of being further cured to harden into a permanent shape with a greater rigidity and which is structurally self-supporting. The thermosetting polymer may be produced from a resin or prepolymer that includes a number of individual monomers which are molecules that can react with each other to form a polymer chain, for example, by cross-linking. In the process of polymerization, the thermosetting polymer gains structural rigidity and becomes a solid. Examples of suitable thermosetting polymers include polyester resins and vinyl ester resins, although any suitable thermosetting polymer can be used in accordance with the disclosure.

To facilitate fabrication of the cable tray system at the point installation, the thermosetting polymer that the rails is made of are provided as soft solid curable polymer strips 120. A physical characteristic of a soft solid is that the curable polymer strip 120 is structurally, intact but is still in a pliable or malleable state to retain a degree of flexibility. In other words the constituent components of the soft solid curable polymer strips will not disassociated from each other and can be transported as a strip to the point of installation. Accordingly, the soft solid curable polymer strips 120 can be further worked or molded into a different or final desired shape. This enables the soft solid curable polymer strips 120 to be formed or shaped onsite into the configuration for the individual cable trays to selectively direct the flexible cables about the installation. The soft solid state can be obtained by partially curing the thermosetting polymer at the time it is molded into the shape of the soft solid curable polymer strips 120. For example, the thermosetting polymer may be extruded into the soft solid curable polymer strips and partial curing may occur during extrusion. The partially cured soft solid curable polymer strips 120 can, after being molded into a final shape when fabricating the cable trays, be fully cured to harden into a solid structure.

The soft solid curable polymer strips 120 can be flattened elongate strips with a thin rectangular shape including a breadth 122 corresponding to width or height of the strip and a thickness 124 of a significantly smaller dimension than the breadth 122. The soft solid curable polymer strips 120 may have any suitable length which may correspond to the longitudinal direction of the strip so that multiple rail sections can be cut from the same length of a soft solid curable polymer strip. To facilitate storage or transportation, the length of the soft solid curable polymer strips 120 can be wound into a spiral shaped strip roll 126 of a given diameter. Specially, the length of the soft solid curable polymer strip 120 can be circularly layered onto itself in spirals to produce the strip roll 126 that may be generally cylindrical. At the installation site, to form the rails, the desired length of the soft solid curable polymer strips 120 can be unwound from the strip roll 126. The strip roll 126 may be wound or coiled as a standalone arrangement without a core or spool. In another example, the soft solid curable polymer strips 120 may be wound on a strip spool 128 or reel to hold the wound soft solid curable polymer strip together and to facilitate unreeling at the installation.

Figure 4:
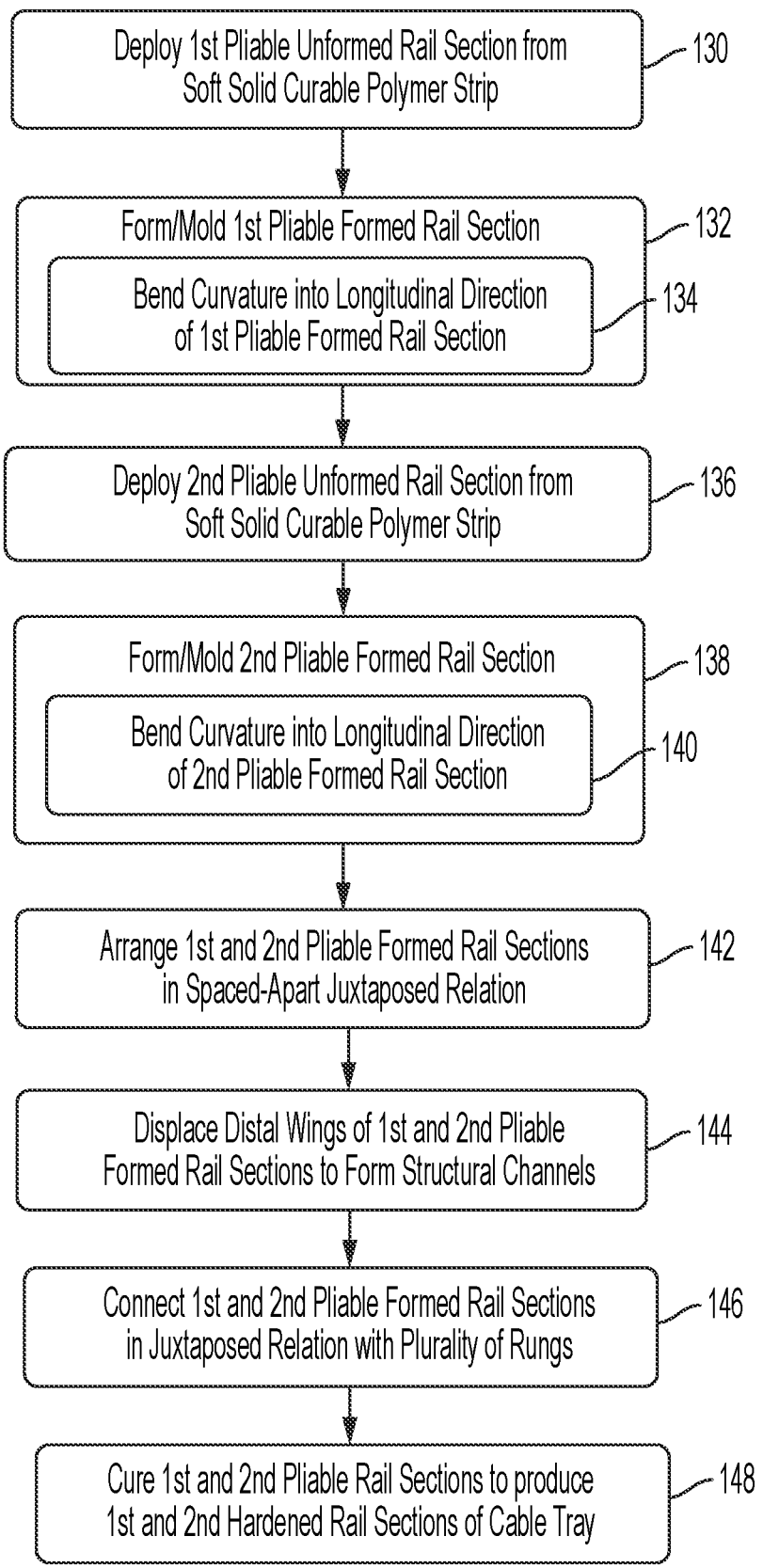
FIG. 4 is a flow chart illustrating a possible list of actions and steps for fabricating a cable tray system from soft solid curable polymer strips that may be formed and cured to produce hardened rail sections.

Referring to FIG. 4, there is a flow chart including possible steps or actions 130-148 for fabricating a cable tray from the wound soft solid curable polymer strips 120 at the point of installation. The flow chart is exemplary only and steps or actions may be added or removed during the fabrication process. To further explain the steps of the flow chart, the steps will be describes with reference to FIGS. 5, 6-7, and 8-9. In an initial deployment step 130, a desired length of the soft solid curable polymer strip 120 is deployed and cut or separated from the remaining length of the curable polymer strip 120. In the examples where the soft solid curable polymer strips 120 are provided as wound strip rolls 126 or wound on a strip spool 128, the deployment step 132 can involve unwinding or unreeling the need length of the soft solid curable polymer strip.

Figure 5:
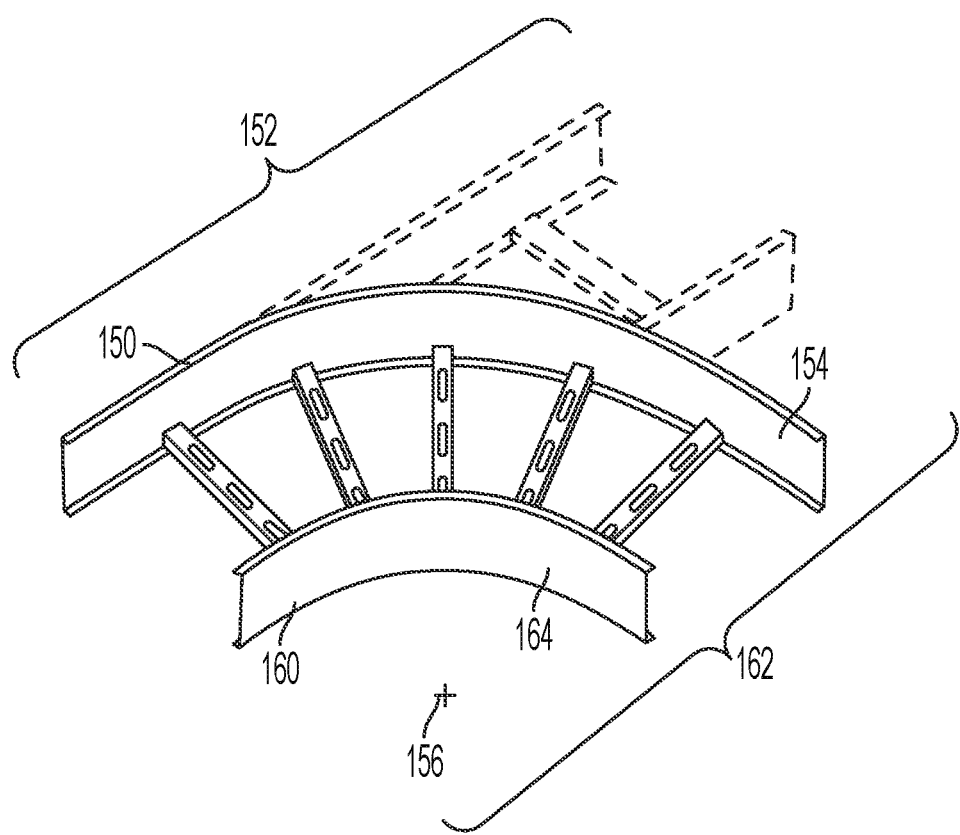
FIG. 5 is a perspective view of a first pliable formed rail section formed from the deployed first pliable unformed rail section (shown in dashed line) and a second pliable formed rail section formed from the deployed second pliable unformed rail section (shown in dashed lines).

Referring to FIG. 5, when cut to the desired length, the soft solid curable polymer strip 120 becomes a first pliable unformed rail section 150. Although still flexible, the first pliable unformed rail section 150 can have an associated first longitudinal extension 152 that corresponds to the length of the soft solid curable polymer strip 120 deployed. The longitudinal extension 152 can be appreciated when the first pliable unformed rail section 150 is linearly straightened or laid out as indicated by dashed lines in FIG. 5.

In a first forming operation 132, the first pliable unformed rail section 150 can be worked or molded into a shape that corresponds with the configuration of the cable tray being fabricated. The retained flexibility of the first pliable unformed rail section 150 facilitates forming or molding during the forming operation 132. Once formed or molded, the first pliable unformed rail section 150 becomes a first pliable formed rail section 154, which may be indicated by the solid lines in FIG. 5. Prior to curing, the first pliable formed rail section 154 still retains flexibility but assumes a different or distinct shape. In an example, the forming operation 132 may including a first bending step 134 in which curvature is bent into the longitudinal extension 152, The first bending step 134 can be conducted when, for example, forming a horizontal elbow 112 described in FIG. 1 above. The curvature may be formed or imparted with respect to a center of curvature 156 and may be produced using molds or may be accomplished by hand. In a similar manner, the first bending step 134 may bend curvature into longitudinal extension 152 when forming the first pliable formed rail section 154 to produce a vertical elbow 114 described in FIG. 1 above.

Because cable trays typically include two rails, a second deployment step 136 may be conducted in which another desired length of the soft solid curable polymer strip 120 is deployed and cut or separated from the remaining length to provide a second pliable unformed rail section 160. The second pliable unformed rail section 160 may have or be associated with a second longitudinal extension 162, which may be the same as or different than the first longitudinal extension 152 of the first pliable unformed rail section 150. A second forming operation 138 can be conducted in which the second pliable unformed rail section 160 is formed or molded into a different shape, facilitated by the retained flexibility of the thermosetting material, to produce a second pliable formed rail section 164. The second pliable formed rail section 164 may correspond in shape with the first pliable formed rail section 154. When forming a cable tray configured as a horizontal bend, for example, the second forming operation 138 may include a bending step 140 in which curvature is imparted into the longitudinal extension 162 of the second pliable formed rail section 164 to produce a curved shaped which may share the center of curvature 156. It can be appreciated that when configuring a horizontal elbow from the first and second pliable formed rail sections 154, 164, the dimensions of the respective longitudinal extensions 152, 162 should be different.

In an arrangement operation 142, the first pliable formed rail section 154 and the second pliable formed rail section 164 may be arranged in a spaced-apart juxtaposed relation. In an example, the first and second pliable formed rail sections 154, 164 may be parallel to each other and may be spaced-apart a consistent distance over their longitudinal extensions as illustrated in FIG. 5. However, in other examples, the first and second pliable formed rail sections 154, 164 may diverge or converge with respect to each other while still being juxtaposed side-by-side. Diverging or converging the first and second pliable formed rail sections 154, 164 may occur, for example, when fabricating the cable tray having an expander configuration or a reducer configuration wherein the width or breadth of the cable tray changes to accommodate more or fewer individual flexible cables.

Figure 6:
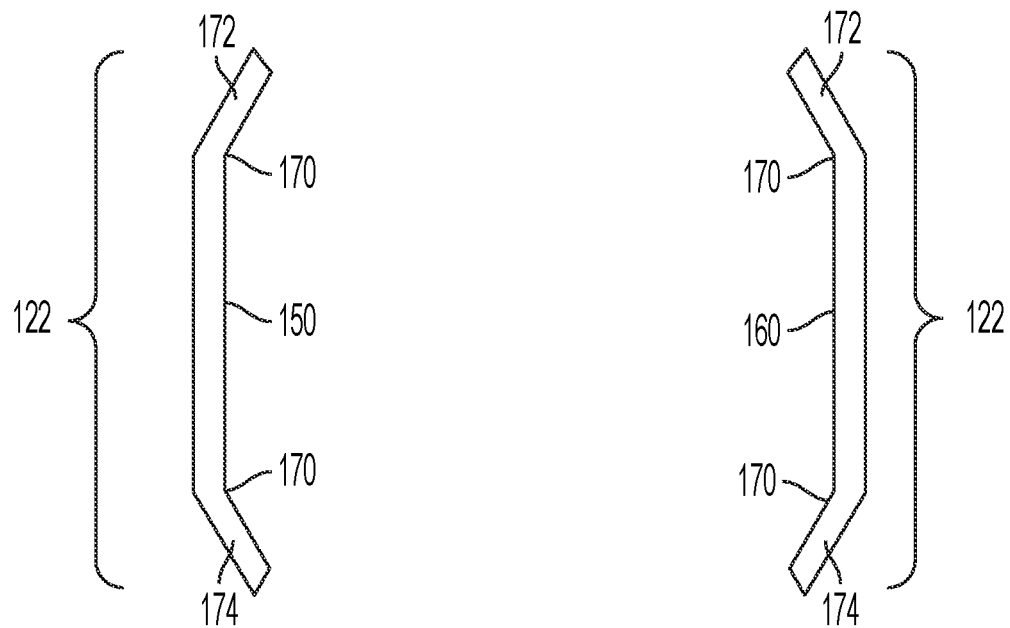
FIG. 6 is an elevational view taken from the ends of a first pliable unformed rail section and a second pliable unformed section in a juxtaposed arrangement.
Figure 7:
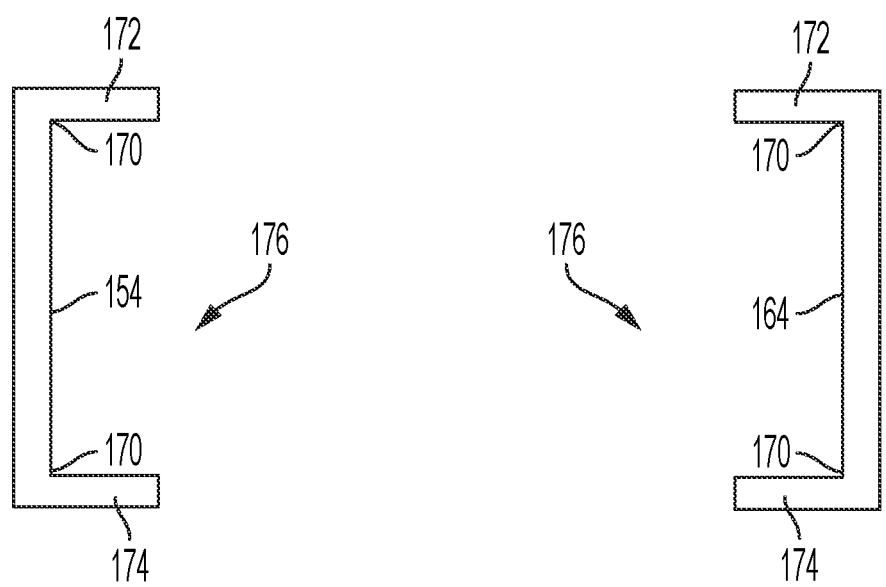
FIG. 7 is an elevational view similar to FIG. 6 of the first pliable formed rail section and the second pliable formed rail section after being formed into structural channels.
Figure 8:
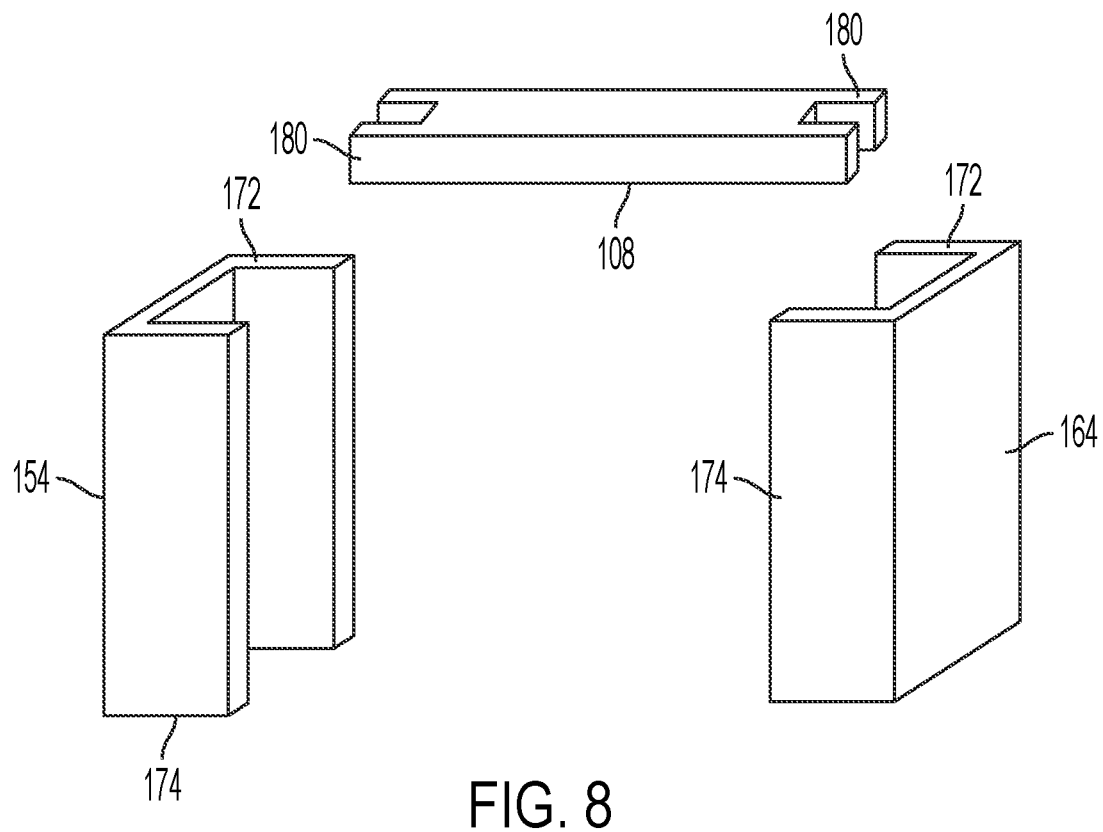
FIG. 8 is a perspective view of the first pliable formed rail section and the second pliable formed rail section in a juxtaposed arrangement in an unassembled state.
Figure 9:
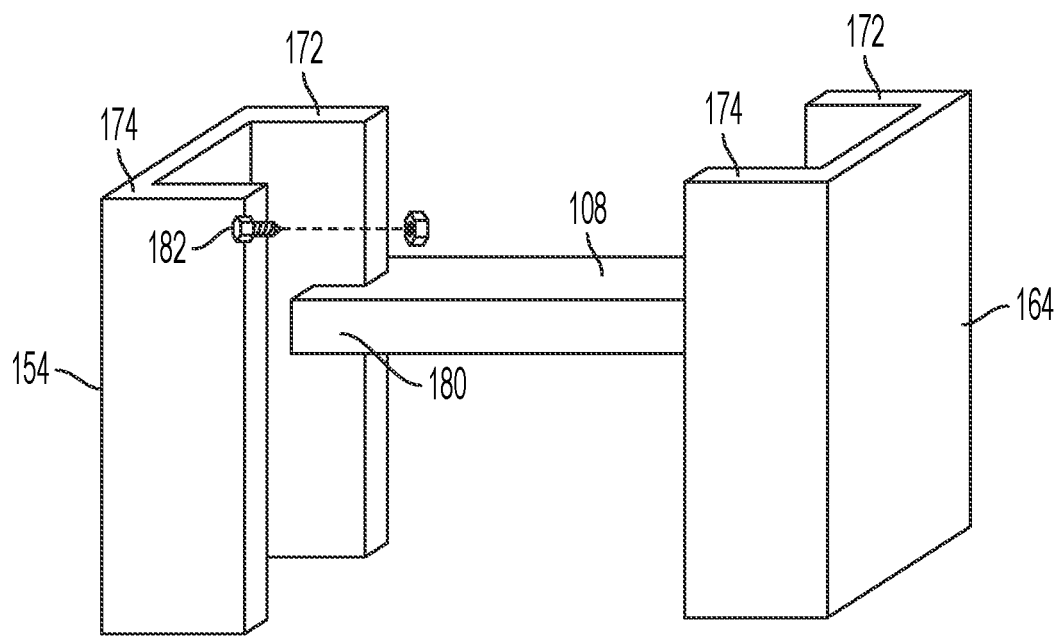
FIG. 9 is a perspective view of the first pliable formed rail section and the second pliable formed rail section transversely connected together by a plurality of rungs.

In an embodiment, the first and second pliable formed rail sections 154, 164 may be formed as structural channels to increase the rigidity or stiffness of the fabricated rails. Referring to FIGS. 6 and 7, there is illustrated a possible channeling step 144 which may be part of the first and second forming operations 132, 138 during forming or molding of the first and second pliable unformed rail sections 150, 160. The first and second pliable unformed rail sections 150, 160 may have or be associated with corresponding first and second breadths 122 that corresponds with the width or height of the pliable unformed rail sections and which is orthogonal to first and second elongated extensions 152, 162 associated with those sections. In an example, when deployed, the first and second pliable unformed rail sections 150, 160 may be flat and linear and the breaths 122 may correspond to the straight linear width or height of the pliable unformed rail sections.

However, in another example, to facilitate the channeling operation 144 the first and second pliable unformed rail sections 150, 160 may include a preformed flexure 170 disposed into the respective breadths 122 and which extends lineally along the longitudinal extension 152, 162 of the respective pliable unformed rail section. The flexure 170 can be formed when the soft solid curable polymer strip 120 is extruded. The flexure 170 imparts flexibility into the breath 122 of the first and second pliable unformed rail sections 150, 160 that allows them to be complaint and bend in specific directions. The flexures 170 segment or define respective first and second distal wings 172, 174 into each to the breaths 122 of the respective pliable unformed rail sections 150, 160. The distal wings 172, 174 may extend at an angle with respect to the rest of the breath 122 of the respective pliable unformed rail sections 150, 160, which may be angled by only a few degrees from the orientation of the breadths.

During the channeling operation 144, the distal wings 172, 174 are displaced or angled so that the distal wings are normal or perpendicular to the rest of the breath 122 of the partially formed first and second pliable formed rail sections 154, 164. The first and second pliable formed rail sections 154, 164 assume the shape of a structural channel 176 such as U-channel or C-channel in which the first and second distal wings 172, 174 function as flanges and the remaining breadth 122 of the first and second pliable formed rail sections 154, 164 is a web joining the flanges. Molding or shaping the first and second pliable formed rail sections 154, 164 as structural channels 176 with integral orthogonal flanges and a web resists bending moments that may be experienced by the the finished fabricated rails.

In a connection step 146, the first pliable formed rail section 154 and the second pliable formed rail section 164 in the juxtaposed arrangement can be connected together with a plurality of rungs 108. For example, referring to FIGS. 8 and 9, the first and second pliable formed rail sections 154, 164 may be spaced apart from each other and, in an example, may be parallel to each other. Further, when the first and second pliable formed rail sections 154, 164 are formed as structural channels 176, they may be juxtaposed in a facing or opposed relation. The plurality of rungs 108 may also be made of a thermoplastic material but, unlike the first and second pliable formed rail sections 154, 164, the rungs 108 may be fully cured and rigid at the time of connection. In other examples, the plurality of rungs 108 may be made from other suitable materials. The plurality of rungs 108 may be disposed between the juxtaposed first and second pliable formed rail sections 154, 164 to transverse the spaced-apart distance between the pliable formed rail sections. The plurality of rungs 108 can be connected or secured to each of the first and second pliable formed rail sections 154, 164 by any suitable connection method. For example, the rung ends 180 of each of the plurality of rungs 108 can be formed as a bifurcated clamp and can receive and be clamped to one of the first or second distal wings 172, 174 of each of the first and second pliable formed rail sections. To securely fix the plurality of rungs 108 to the respective first or second distal wings 172, 174, threaded fasteners 182 such as bolts and nuts or possibly rivets can be inserted through the rung ends 180 and the distal wings 172, 174 to affix the structures together. In addition, various types of brackets and supports can be used to affix the rungs 108 to the distal wings 172, 174 of the first and second pliable formed rail sections 154, 164. The plurality of rungs 108 thereby transversely connect the juxtaposed first and second pliable formed rail sections 154, 164 to brace and maintain their spaced-apart relation. Arrangement and fabrication of the first and second pliable formed rail sections 154, 164 transversely connected by the plurality of rungs 108 thus far assumes the arrangement of a ladder type cable tray 102.

Figure 10:
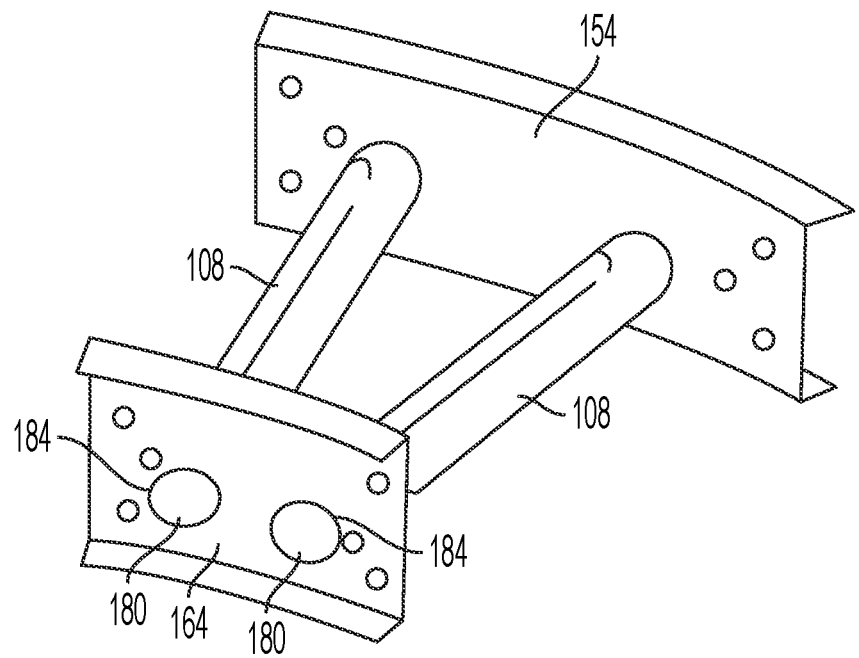
FIG. 10 is a perspective view of a rung transversely connecting first and second formed rail sections with a dowel joint connection.
Figure 11:
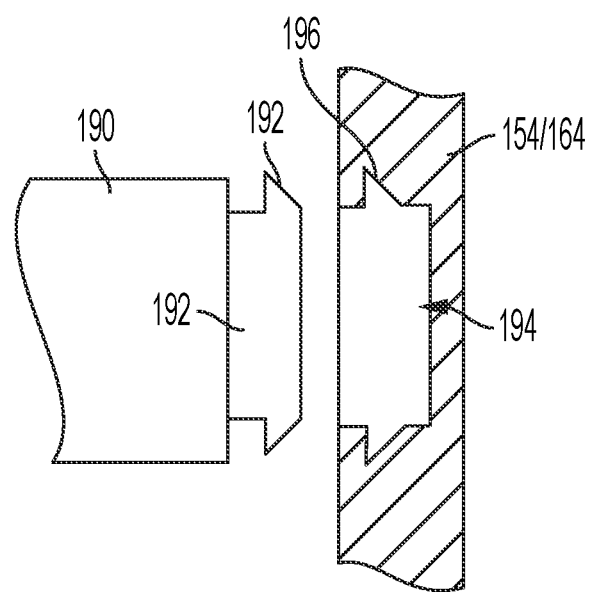
FIG. 11 is a cross-sectional view of a snap-fit connection for connecting the plurality of rungs transversely to one of the first and second pliable formed rail sections.

Referring to FIGS. 10 and 11, there are illustrated additional connection techniques for affixing the plurality of rungs 108 transversely between the first and second pliable formed rail sections 154, 164. In FIG. 10, the plurality of rungs 108 may be each shaped as cylindrical rods with a circular outer diameter and may be cut to the axial length corresponding to the spaced-apart distance that should be maintained between the first and second pliable formed rail sections 154, 164 once the cable tray is fabricated and installed. In an example, the individual rods corresponding to the plurality of rungs 108 may be cut onsite at the installation site from a longer rod provided with the soft solid curable polymer strip so that the spaced-apart distance between first and second pliable formed rail sections 154, 164, corresponding to the width of the cable trays, can be customized onsite.

Disposed into the first and second pliable formed rail sections 154, 164, preferably aligned toward the ends of the breaths 122, of the first and second pliable formed rail sections 154, 164, can be a plurality of dowel holes 184. The diameter of the dowel holes 184 can match the diameters of the plurality of rungs 108 so that the rung ends 180 can be press fit into the plurality of dowel holes 184, thereby securing the plurality of rungs to the first and second pliable formed rail sections 154, 164. Press fitting the rung ends 180 into the plurality of dowel holes 184 may be aided by the pliability of the first and second pliable formed rail sections 154, 164. The plurality of dowel holes 184 can be formed during extrusion, deployment or forming of the first and second pliable formed rail sections 154, 164.

Referring to FIG. 11, there is illustrated an example where the connection between plurality of rungs 108 and the first and second pliable formed rail sections 154, 164 is designed as an annular snap-fit connection. The rung ends 180 can be formed with an axial protrusion 190 smaller in diameter that the rungs 108 and that has an annular shoulder 192 extending about the circumference of the axial protrusion. Disposed into the breaths of the first and second pliable formed rail sections 154, 164 can be a corresponding cylindrical cavity 194 dimensioned to receive the axial protrusion 190 and with an annular groove 196 that extends circumferentially outward of the cylindrical cavity. When the axial protrusion 190 is inserted into the cylindrical cavity 194, the annular shoulder 192 can be received in and interlock with the annular groove 194 locking the structures together. The pliability of the first and second pliable formed rail sections 154, 164 allows the material of these structures to deflect facilitating the interlocking of the snap fit connection.

Figure 12:
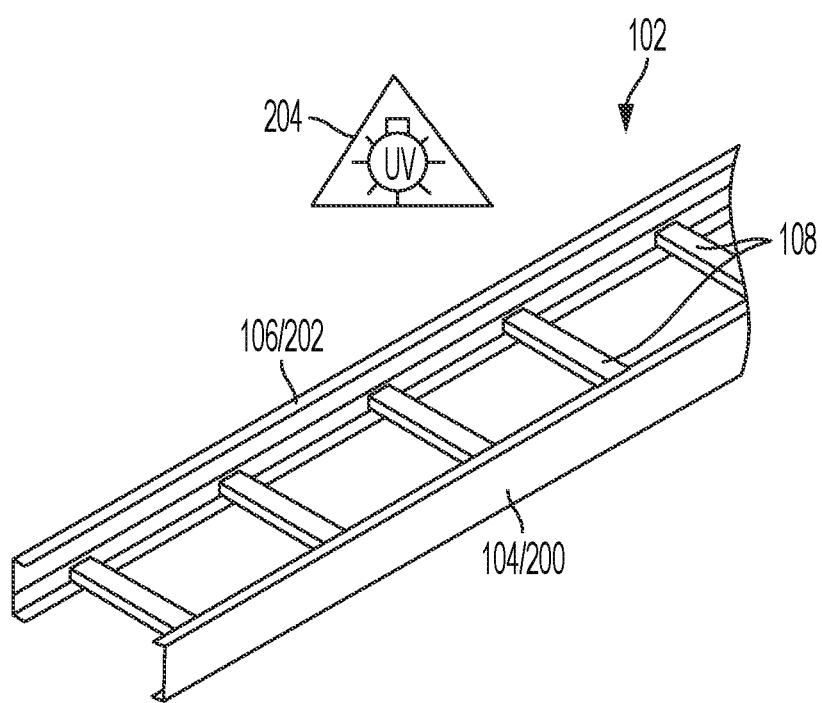
FIG. 12 is a perspective view of a curing process for fabricating a cable tray by polymerizing the first and second pliable formed rail sections into first and second hardened rail sections.

In a curing step 148, the thermosetting polymer of the first and second pliable formed rail sections 154, 164 is fully cured to molecularly polymerize and structurally harden them into a respective first hardened rail section and a second hardened rail section. Referring to FIG. 12, there is illustrated an example by which the thermosetting material may be cured to fabricate the first hardened rail section 200 and the second hardened rail section 202. The thermosetting polymer that is the initial starting material of the first and second hardened rail sections 200, 202 may be a photopolymer that reacts and changes its physical properties upon exposure to electromagnetic radiation, particularly ultraviolet light or visible light. Exposure to light radiation completes the curing process by which the monomers in the photopolymer material continue cross-linking to complete the polymerized chains. This increases the rigidity of the polymer material to result in a hardened solid, for example, the first and second hardened rail sections 200, 202. The hardened first hardened rail section and a second hardened rail sections 200, 202 are no longer flexible and will retain the definite shape and configuration molded by the first and second forming operations 132, 136 conducted previously. The first hardened rail section 200 may correspond to the first rail 104 and the second hardened rail section may correspond to the second rail section 106 of the cable tray 102.

An advantage of the photo-curing process is that it can be done at the installation site using a ultraviolet (UV) or visible light source 204 such as a lamp after the first and second pliable formed rail sections 154, 164 have be molded, formed, and arranged juxtaposed with each other braced in the spaced-apart relation by the plurality of rungs 108. The light source 204 can be focused on and directed along the longitudinal extension of each of the pliable formed rail sections producing the corresponding first and second hardened rail sections 200, 202. The resulting fabrication is a structurally fixed cable tray 102 of the desired configuration including a first rail 104 and a second rail 106 spaced apart by a plurality of transverse flings 108.

In an example, to facilitate onsite fabrication of the cable trays 102 during installation of the cable tray system, various components and structures described herein can be provided together as a kit. For example, the kit may include a length of the soft solid curable polymer strip 120, which may be provided as a strip roll 126 or wound onto a strip spool 128, and a light source 204 for curing the first and second pliable formed rail sections 154, 164 cut and formed from the soft solid curable polymer strip 120.

Figure 13:
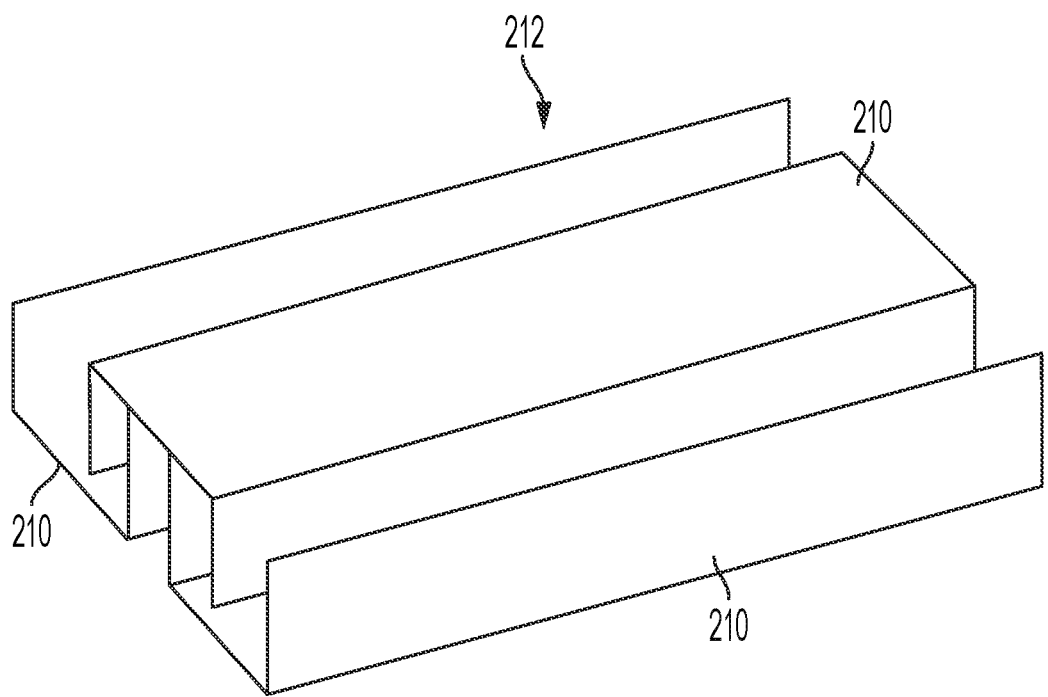
FIG. 13 is a perspective view of another embodiment in which the soft solid curable polymer strips may be provided as a plurality of semi-soft uncured rail planks arranged as a stack.

Referring to FIG. 13, there is illustrated another example of the soft solid curable polymer strips 120 from which the cable trays can be fabricated. In the illustrated example, the curable polymer strips 120 can be provided in the form of a plurality of soft solid curable polymer planks 210 that are elongated and linearly straight in shape. Moreover, a plurality of the soft solid curable polymer planks 210 may be arranged in a stack 212 to facilitate storage and transportation to the installation site. In the illustrated example, the soft solid curable polymer planks 210 may be partially formed as structural channels, for example, C-channels or U-channels, during an extrusion process. The partially formed curable polymer planks 210, however, may retain flexibility or pliability for subsequent forming and molding operations. The shape of the structural channels enables them to be placed together in a superimposed relationship that reduces the bulk of the stack 212. At the installation site, the individual soft solid curable polymer planks 210 can be deployed from the stack, cut to length, and molded or formed into the necessary shape, for example, by bending curvature into the longitudinal extension of the curable polymer blank, to fabricate cable trays in the configuration of a horizontal or vertical elbow. The curing operation 138 described above can be conducted to finish fabricating the hardened and rigid cable tray of the desired configuration.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

The invention claimed is:

1. A method of fabricating a cable tray comprising:
   deploying a first pliable unformed rail section from a soft solid curable polymer strip;
   forming the first pliable unformed rail section into a first pliable formed rail section having a definitive shape;
   deploying a second pliable unformed rail section from the soft solid curable polymer strip;
   forming the second pliable unformed rail section into a second pliable formed rail section having a definitive shape;
   arranging the first pliable formed rail section and the second pliable formed rail section juxtaposed to each other;
   transversely connecting the first pliable formed rail section and the second pliable formed rail section with a plurality of rungs to maintain spacing apart of the first and second pliable formed rail sections; and
   curing the first pliable formed rail section and second pliable formed rail section to produces a first hardened rail section and a second hardened rail section connected by the plurality of rungs.

2. The method of claim 1, wherein the steps of deploying the first pliable unformed rail section and deploying the second pliable unformed rail section comprises unwinding the soft solid curable polymer strip from a strip roll.

3. The method of claim 1, wherein the soft solid curable polymer strip is wound on a strip spool.

4. The method of claim 1, wherein the step of forming the first pliable unformed rail section includes bending curvature into a longitudinal extension of the first pliable unformed rail section to produce the first pliable formed rail section.

5. The method of claim 4, wherein the step of bending curvature into the longitudinal extension will produce one of a horizontal elbow or a vertical elbow.

6. The method of claim 1, wherein the step of forming the first pliable unformed rail section includes displacing a breadth of the first pliable unformed rail section to produce a structural channel.

7. The method of claim 6, wherein the breath of the first pliable unformed rail section includes one or more flexures disposed therein that segment the breath into at least a first distal wing and a second distal wing.

8. The method of claim 7, wherein the structural channel is one of a U-shaped channel or a C-shaped channel.

9. The method of claim 1 wherein the step of curing the first pliable formed rail section and the second pliable formed rail section includes photo-curing with a radiation source.

10. The method of claim 9, wherein the soft solid curable polymer strip is comprised of a photopolymer material.

11. The method of claim 10, wherein the soft solid curable polymer strip is partially cured prior to deploying the first pliable unformed rail section and the second pliable unformed rail section.

12. The method of claim 1, wherein the plurality of rungs are rigid straps or rigid rods.

13. The method of claim 12, wherein the step of transversely connecting the plurality of rungs between the first pliable formed rail section and the second pliable formed rail section is accomplished by one or more of a clamped connection, a threaded fastener connection, a doweled joint connection and a snap fit connection.

* * * * *